Aug. 26, 1947.    L. F. HOPE    2,426,305
BALANCING MACHINE
Filed March 12, 1942    2 Sheets-Sheet 2
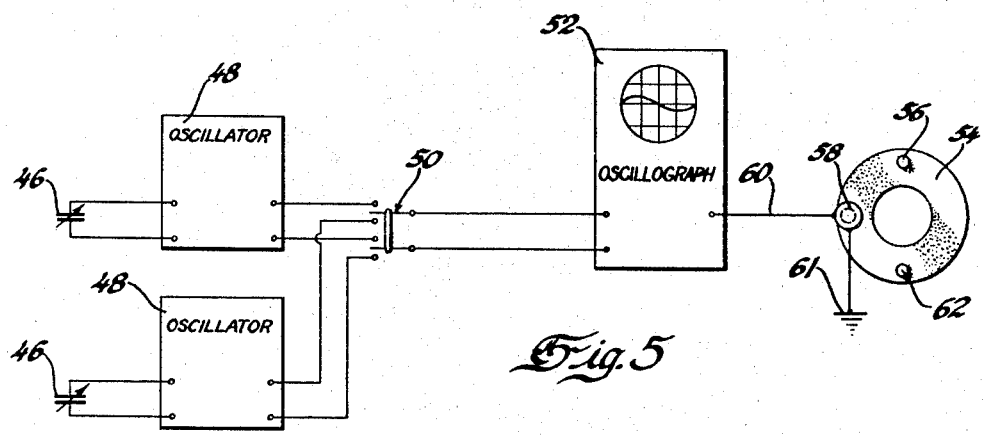
Fig. 5
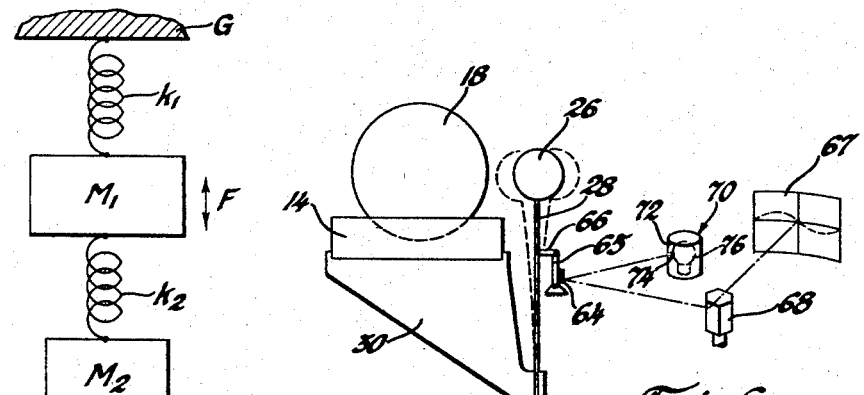
Fig. 6
Fig. 7
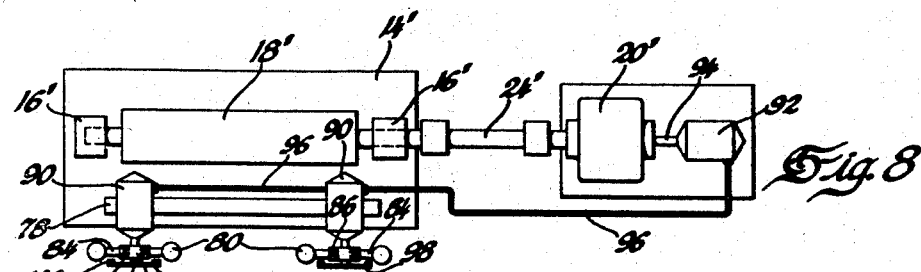
Fig. 8
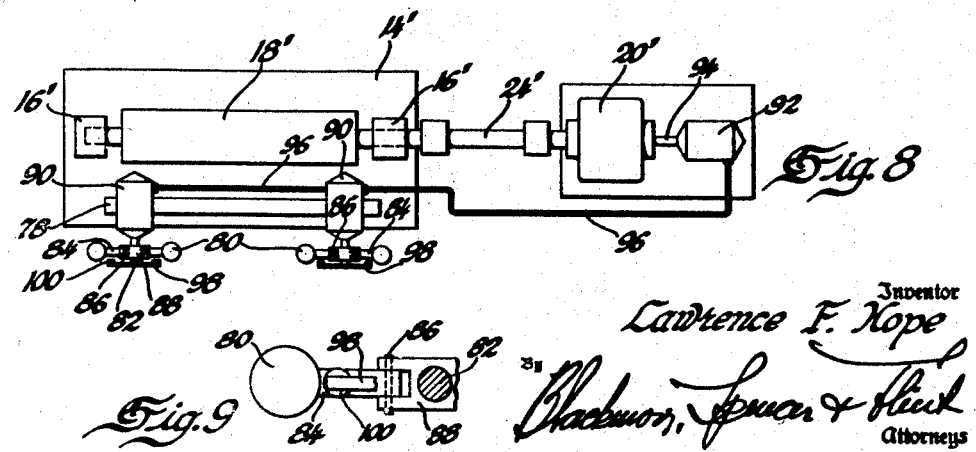
Fig. 9
Inventor
Lawrence F. Hope
Attorneys Patented Aug. 26, 1947

2,426,305

UNITED STATES PATENT OFFICE 2,426,305

BALANCING MACHINE

Lawrence F. Hope, Detroit, Mich., assignor to General Motors Corporation, Detroit, Mich., a corporation of Delaware Application March 12, 1942, Serial No. 434,414

12 Claims. (Cl. 73—66)

This invention relates to balancing machines, specifically to the type which may be used to determine the amount of unbalance and its angular position in a selected plane of a rotating unbalanced mass.

The problem which today confronts the designer and engineer interested in eliminating vibration caused by the rotation of unbalanced masses is largely one of flexibility and adaptability of apparatus to the varying sizes and shapes of masses to be balanced. The balancing machines at present available operate quite satisfactorily when they have once been adapted to a particular machine part, but considerable adjustment and change are usually necessary to adapt the apparatus to other parts differing considerably in size and shape. Furthermore, even for a particular adaptation, the machines today available often have the disadvantage of giving the unbalance indication in a plane in which it is not possible or practicable to make the necessary corrections because of the shape of the part in that plane. It then becomes necessary to resort to considerable calibration involving time-consuming calculations and/or trial-and-error methods to determine the location and amount of correction in the plane in which correction is possible or feasible.

It is the object of this invention to provide apparatus which permits the determination of unbalanced forces in rotating masses and the angular position of those forces relative to a reference radius, and which is not limited in the location of the plane of the indicator means. To this end I provide a cradle or frame in which is rotatably mounted an unbalanced mass, the unbalance of which is to be determined. Another mass is fastened to the cradle through an elastic or vibratile connection. This mass-and-elasticity combination is such as to have a resonant frequency which is the same as the speed of rotation of the unbalanced mass and it is mounted on the frame so as to permit vibration of the mass in a direction perpendicular to the axis of rotation of the unbalanced mass. Means are provided to determine the amount of the unbalanced force and its angular position on the shaft by measurement of the vibration of said elastic mass and its phase angle relative to a reference radius on the rotating part.

The cradle or frame in which the unbalanced mass is rotatably mounted will ordinarily be mounted on a non-rigid support so as to give the frame at least one degree of freedom of movement. The elastically or oscillatably connected mass is preferably mounted so as to be slidable parallel to the axis of rotation of the unbalanced mass, to permit selection of the plane in which the unbalance is to be determined. It will usually be found expedient to use two elastically connected masses, although it will be understood by those skilled in the art that one such mass can be made to suffice. The means to measure the extent and angular position, or direction, of unbalance in the selected plane can conveniently be a cathode ray oscillograph, the sweep circuit of which is synchronized with the speed of rotation of the unbalanced mass. Alternatively, mechanical means may be used instead of the oscillograph.

Figure 1 of the drawings shows a front elevation view of one embodiment of my invention.

Figure 5 is a diagram of the oscillograph circuit and its connections to the balancing machine.

Figure 6 is a view, partially in perspective, showing mechanical means for obtaining a visual indication of the amount and angular position of unbalance.

Figure 7 is a diagram used to demonstrate the theory upon which machines made according to my invention operate.

Figure 8 is a top plan view illustrating an embodiment of my invention which has somewhat broader applications than the embodiments shown in Figures 1 to 4 and 6; and Figure 9 is a front elevation view of a portion of the pivoted mass of Figure 8 and its associated vibration measuring means.

Figure 1:
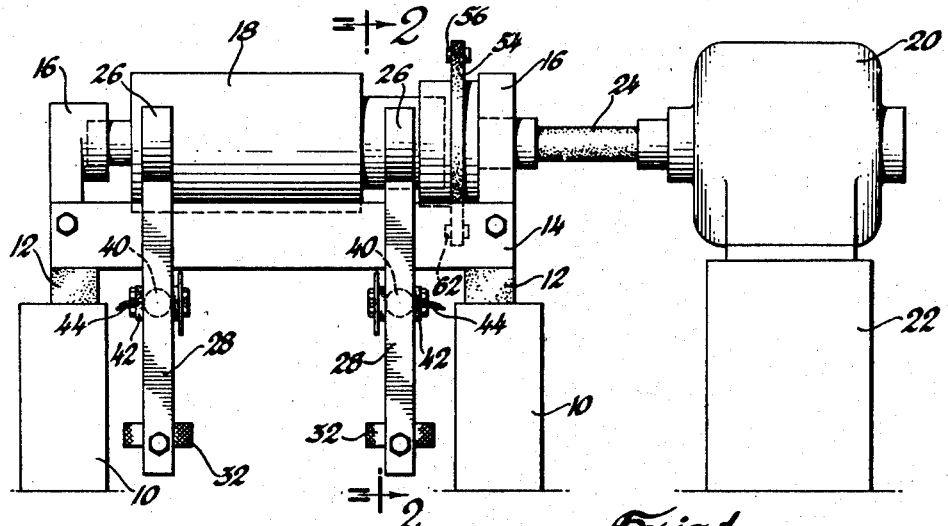

Referring now to Figure 1 of the drawings, 10 indicates a pair of pedestals upon which rest blocks of resilient material 12, such as sponge rubber, to provide non-rigid support for a cradle or frame 14. It has been found desirable to support frame 14 by means which give some form of damping which is proportional to velocity, to eliminate the establishing of "beat notes" by the two vibrating elastically connected masses. Sponge rubber blocks serve this purpose. Rotatably mounted in bearings 16 is a mass 18 which is unequally or eccentrically distributed about the axis of rotation to provide unbalanced forces acting upon the bearings when the mass is rotated. Mass 18 may be any rotating machine part which it is desired to balance. Drive means 20, such as an electric motor, resting on a pedestal 22 may be connected through flexible coupling 24 to rotate the mass 18. If it be desired to eliminate the difficulties arising out of use of a flexible coupling or for any other reason, the drive motor may be mounted directly on the frame 14.

Figure 2:
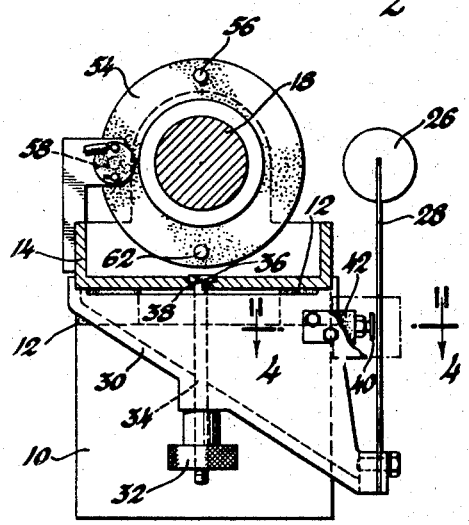
Figure 2 is a view in section substantially on line 2—2 of Figure 1.
Figure 3:
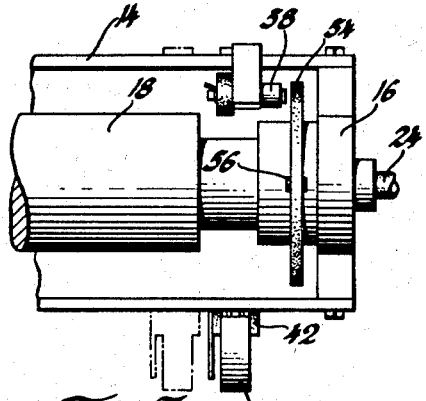
Figure 3 is a top plan view of a portion of my machine showing details of the means by which the oscillograph sweep circuit is synchronized with the speed of rotation of the machine.

Referring now to Figure 2, a mass 26 having an elastic connection 28 to frame 14 is shown. In order that mass 26 and its elastic connection may be moved along the axis to provide for selection of the plane in which the balancing is to be done, mass 26 and spring 28 are attached to a bracket 30. Bracket 30 is held to the underside of frame 14 by nut 32 and clamping screw 34, said screw having a head 36 which engages a slot 38 in cradle 14. Slot 38 is substantially parallel to the axis of rotation of mass 18.

As can be seen from Figure 1, two masses 26 and their elastic or vibratile connections 28 are provided, one for each end of the rotating mass 18. Where the rotating mass is quite long in the direction of the axis of rotation it is highly desirable to balance the mass in two planes, one plane being at or near each end of the axis of rotation, so long as the selected plane of indication is such as to permit correction for the unbalance, having in mind limitations imposed by the structure of the machine part.

The amount of unbalance may be determined by measurement of the amplitude of vibration of the elastically connected mass; the angular position of the unbalance relative to a reference radius may be determined by the phase relationship of the vibration to said reference radius. This measurement may be effected in any of a number of ways. A method which I have found convenient is one which utilizes the changing capacitance of a variable air gap condenser, one plate of which is fixed and the other plate of which moves in proportion to the amount of vibration of the elastically connected mass. The fixed plate 40 is shown in Figure 2 as being secured to bracket 30 by means of an insulating pad 42. Spring 28 may itself serve as the moving plate. A terminal 44 (Figure 4) may be provided for electrical connection to plate 40.

Figure 4:
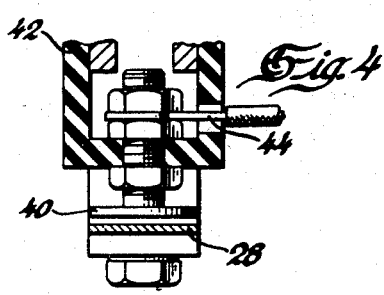
Figure 4 is a view in section substantially on line 4—4 of Figure 2.

In the circuit diagram of Figure 5, the variable condensers 46 represent fixed plates 40 and moving plates 28 of Figures 1, 2 and 4. Each of condensers 46 is shown as connected to an oscillator unit 48 which may be connected through a selector switch 50 to cathode ray oscillograph 52. The principle of the indicator system comprising the condenser and oscillator unit is the production of a high frequency alternating current the amplitude of which is modulated by variations in the capacitance of the condenser. This modulated wave is detected, in much the same manner as in radio reception, and the resultant wave, shown on the oscillograph screen, is a direct indication of the relative mechanical movements of the condenser plates.

In order that the visual indication on the cathode ray oscillograph may be synchronized with the speed of rotation of the unbalanced mass, I have provided a disc 54 of insulating material mounted on the shaft which carries mass 18. Disc 54 may be provided with a magnet, such as permanent magnet insert 56 which rotates past a pick-up coil 58. As can be seen in Figure 5, coil 58 is connected to the sweep synchronizer terminals of oscillograph 52 through a lead 60 and ground 61. The synchronizing "pulse" occurs as the magnet passes the pick-up coil. In order that disc 54 will not be unbalanced by the weight of permanent magnet 56, I may provide an equivalent weight 62 diametrically opposite to magnet 56. Weight 62 will be made of any suitable nonmagnetic material such as brass. Alternatively, of course, a few holes could be drilled in disc 54 near magnet 56 to compensate for the additional weight of the magnet.

Inasmuch as the oscillograph is conventional and is well understood by those skilled in the art, no attempt is made here to detail the oscillograph circuit or the functioning of the oscillograph.

Instead of the electrical means of providing visual indication of the unbalance in the rotating mass as disclosed above, I may provide mechanical means as shown in Figure 6. In this figure, mass 18 is rotatable in frame 14 as before, and weight 26 has an elastic connection 28 through bracket 30 to frame 14. A suitable reflecting light means 64 may be provided on pivoted lever 65 which is connected to spring 28 by link 66. The light reflected from 64 is preferably a very narrow beam which is directed onto a screen 67 by means of a synchronizer 68 such as a rotating mirror. It will be evident to those skilled in the art that the light rays directed on 64 may be from any form of illumination such as a small electric light bulb such as primary source 70 which may comprise a shield 72 having a small opening 74 through which the light from electric light bulb 76 is directed toward element 64; element 64 may be any suitable mirror.

As will be understood by those skilled in the art, mirror 68 will be synchronized with vibrating weight 26 to produce a "standing wave" curve on screen 67.

For a better understanding of the operation of my invention, reference is now had to the elementary diagram of Figure 7. In this figure a mass $M_1$ is shown as fixed to a foundation G through an elastic connection $k_1$ such as a helical spring. Spring $k_1$ is provided to indicate that the mass $M_1$ has one degree of freedom. For the purpose of this problem it will be assumed that mass $M_1$ is limited in movement to the degree of freedom which is up and down as seen in Figure 7. Let us suppose now that an alternating vertical force F is applied to mass $M_1$ at a fixed frequency to move mass $M_1$ in that direction in which it is free to move. If now a second mass, $M_2$, be provided with an elastic connection to mass $M_1$, said connection being the spring $k_2$, and if the mass and elasticity values as represented by $M_2$ and $k_2$ be such that the mass $M_2$ and spring $k_2$ have a resonant frequency which is the same as the frequency of vibration of mass $M_1$, it will be found that the amplitude of vibration of mass $M_1$ will be reduced to zero and $M_2$ and spring $k_2$ will continue to vibrate with such an amplitude and phase angle that the inertia force they develop directly opposes and cancels the exciting force F, so that the main mass $M_1$ will cease to vibrate. So long as the mass and elasticity values of $M_2$ and $k_2$ are such that their resonant frequency is the same as the frequency of force F, it will be found that the value of mass $M_1$ can be changed without disturbing the equilibrium condition established originally—i. e. in which the amplitude of vibration of mass $M_1$ equals zero. It will be found, however, that as force F increases, the amplitude of vibration of mass $M_2$ will increase.

This principle of vibrating forces and resonance has been applied to provide the balancing machine of Figures 1 to 6. The mass $M_1$ and the force F tending to vibrate $M_1$ are represented by unbalanced mass 18 in rotation. The degree of freedom of movement provided by spring $k_1$ is provided in the machine by non-rigid supports 12 which permit frame 14 limited movement of vibration relatively to pedestals 10 in a direction which is right and left as seen in Figure 2. The elastically connected mass represented by mass $M_2$ and its elastic connection $k_2$ is shown in Figures 1 and 2 as weight 26 and spring 28. It should be understood that any combination of mass and elasticity will suffice so long as the said elastically connected mass has a resonant frequency which is the same as the speed of rotation of mass 18, because it is the rotation of the unbalanced mass which provides the force F of Figure 7. It is desired to point out that the bodies or masses being tested do not have to be of the same configuration or dimension with my device, the only requirement being that they physically fit into the frame for rotation. Since the revolutions per minute are always the same, the unbalanced forces whirl at the same frequency in all cases and the vibratable masses will oscillate at an amplitude depending upon the unbalanced forces in the plane of oscillation of that particular part. Therefore, the individual configuration does not have to be compensated for and any variety of parts can be applied to the machine in succession. In the embodiment shown in Figures 1 and 2, resonance may be obtained by varying weight 26 or the stiffness of spring 28. However, in order that the motion of weight 26 may closely approximate simple harmonic motion, the amplitude of vibration of weight 26 should be kept small. For this reason weight 26 will preferably be so large that the amplitude of vibration will be limited to a few hundredths of an inch. Furthermore, as much as possible of the elastically connected mass should be disposed in the plane of vibration. To this end, weight 26 should be so disposed that its center of gravity is substantially on a line through the axis of rotation of the unbalanced mass, that line being parallel to the direction of vibration. In Figure 2, that line is substantially horizontal.

Since the amplitude of vibration of the elastically connected mass is directly proportional to the force set up by the unbalanced rotating mass, the amplitude is a measure of the amount of unbalance. Furthermore, since the vibration of the elastically connected mass has a definite phase relationship to the angular position of the unbalance, the position or location thereof may be determined by a study of the vibration and a determination of its phase angle relative to an established reference line or point. In the use of a device made according to this invention, the screen of oscillograph 52 and screen 67 of the mechanical visual indicator may be calibrated in inch ounces or depths of a given drill size at a given radius. The angular position, or direction, of the unbalancing force on the machine part will be indicated by the position of the maximum and minimum values of the curve on the screen relative to an arbitrary zero line. As will be understood by those skilled in the art, the zero or reference line in the apparatus shown in Figures 1 to 5 will be the radius which passes through the center of magnet 56.

As was stated above, any combination of mass and elasticity will suffice so long as the resonant frequency of the vibratile or inertia responsive mass is the same as the frequency of vibration of the unbalanced mass which is of course the same as the frequency or speed of rotation. The elastically connected mass in the apparatus shown in Figures 1 to 4 and Figure 6 has the disadvantage of having a fixed resonant frequency driving operation, and it is therefore limited in its application to one rotating speed. I have shown in Figure 8 an embodiment of my invention in which centrifugal force supplies the tunable force for the mass which does not have the limitations above discussed. In this figure, a frame 14' is provided as before having bearings 16' in which rotates a shaft about which mass 18' is eccentrically distributed. A track 78 is provided on frame 14' to slidably mount two vibratile, inertia responsive masses to permit selection of the planes in which the indication of unbalance is to be made, said planes being so disposed as to permit correction for the unbalance in the planes of indication. Drive means 20' having flexible connection 24' with the shaft of mass 18' is provided.

The vibratile, inertia conscious mass in this case is provided in the form of weights 80 having pivoted connection to a shaft 82 which is mounted for rotation about an axis at right angles to the axis of rotation of mass 18'. Specifically, weights 80 are carried by arms 84 which are pivoted as at 86 to a hub 88 on shaft 82. Shaft 82 is rotated at the speed of rotation of mass 18' by virtue of the connection of self-synchronizing electric motors 90 and 92. These motors are available commercially under the name of Autosyn motors and their operation is well understood by those skilled in the art. Autosyn motor 92 is driven by power source 20' through any suitable coupling 94 and is therefore known as the transmitter. Motor 92 is connected in the conventional manner through cable 96 to each of receivers 90. Inasmuch as the function and operation of these self-synchronizing motors is well understood by those skilled in the art, no attempt is made here to show details of the connections between transmitter 92 and receivers 90.

As will be understood by those skilled in the art, a force exerted on frame 14' by the unbalanced rotating mass is transmitted through the Autosyn motor mountings to rotating weights 80, tending to displace those weights. The centrifugal force of the rotating weights, in conjunction with the displacement, operates as a restoring force, in a manner similar to the operation of a pendulum. The resultant vibration of weights 80 is proportional to the amount of unbalance, and is opposite in phase thereto.

In order that the amplitude of vibration of weights 80 may be measured, I have provided arms 98 on shaft 82 which are disposed opposite arms 84. Arms 98 carry a fixed plate 100 of a variable condenser, the moving plate of which is arm 84. As will be understood by those skilled in the art, plate 100 and arm 84 must be electrically insulated from each other. Electrical leads from these moving members may be provided by brushes and slip rings, not shown. Otherwise the oscillator circuit may be the same as shown in Figure 5.

In the apparatus of Figure 8 it will be found that the vibratile, inertia conscious mass is resonant within a wide speed range at whatever speed of rotation mass 18' assumes. The mass 80 and arm 84 pivoted at 86 will act in much the same manner as a pendulum. In order, therefore, to eliminate inaccuracies which would enter into the case for wide amplitudes of vibration of mass 80, the mass 80 should be large enough to limit its required vibration amplitude such that its motion is substantially simple harmonic. This should be in the neighborhood of 5° on each side of the neutral position, or a total of approximately 10° of swing.

It will, of course, be understood that a single mass 80 and arm 84 pivotally secured to shaft 82 will suffice to provide the tuned mass desired. In order, however, to maintain shaft 82 in balance it is desirable to provide two masses 80 at opposite ends of a diameter through the shaft.

I claim:

1. In apparatus to determine the amount and location of unbalanced masses in rotating parts, a base, bearing means resiliently mounted on said base for rotatably supporting a part to be tested, a vibratable mass, mounting means for said mass, guide means on the bearing means extending longitudinally thereof, and connecting means cooperating with said mounting and guide means for attaching said mounting means to said guide means at a selected point along the bearing means, said vibratable mass and its mounting being so proportioned as to be resonant at the speed of rotation of the part and generate nullifying forces to cause the part to rotate without vibration, the amplitude of movement of the mass being a direct indication of the amount of unbalanced force to be corrected.

2. In a balancing machine, a resiliently supported frame to hold a rotating machine part, a shaft adjustably mounted on said frame to rotate about an axis which is perpendicular to the axis of rotation of said machine part, a mass attached to the shaft and pivotal about an axis which is perpendicular to the axis of rotation of said shaft, a system of self-synchronous motors to drive said shaft at the speed of said rotating machine part, and means to measure the vibration of said mass during rotation, said measuring means consisting of a member rigidly secured to the shaft and the pivotally mounted mass forming a variable condenser and an oscilloscope whose deflecting means is connected to said condenser to indicate unbalance.

3. In a balancing machine, a resiliently supported frame to hold a rotating machine part, a shaft adjustably mounted on said frame to rotate about an axis which is perpendicular to the axis of rotation of said machine part, a mass attached to the shaft and pivotal about an axis which is perpendicular to the axis of rotation of said shaft, a system of self-synchronous motors to drive said shaft at the speed of said rotating machine part, and means to measure the vibration of said mass during rotation comprising a member rigidly secured to the shaft and the pivotally mounted mass forming a variable condenser, an oscilloscope whose deflecting means is connected to indicate unbalance and means to synchronize the sweep circuit of the oscilloscope with the speed of the rotating machine part.

4. In a balancing machine, a resiliently supported frame to hold a rotating machine part, a shaft adjustably mounted on said frame to rotate about an axis which is perpendicular to the axis of rotation of said machine part, a mass attached to the shaft and pivotal about an axis which is perpendicular to the axis of rotation of said shaft, a system of self-synchronous motors to drive said shaft at the speed of said rotating machine part, and means to measure the vibration of said mass during rotation comprising a member rigidly secured to the shaft and the pivotally mounted mass forming a variable condenser, an oscilloscope, a magnet carried by the machine part and therefore rotatable at the speed of rotation of the same, a pick-up coil mounted on the frame in inductive relation to the rotating magnet, connections from the pick-up coil to the sweep circuit of the oscilloscope and from the condenser to the deflecting means thereof.

5. A floating frame having an unbalanced mass rotatably mounted therein, a mass, an elastic connection between the mass and the frame, said mass and elastic connection being capable of vibration in a plane and having a resonant frequency equal to the speed of rotation of the unbalanced mass, and whose movement nullifies movement of the frame, adjustable mounting means for the elastic connection on said frame to permit selection of the plane of operation of said elastically connected mass, and means to determine the quantity of unbalance of the unbalanced mass directly from measurement of the vibration of the elastically connected mass.

6. The invention of claim 5, in which the adjustable mounting means to permit selection of the plane of operation comprise a bracket on which the elastically connected mass is mounted, and securing means on the bracket having connection with a slot in the frame.

7. A floating frame having an unbalanced mass mounted to rotate therein, a rotatable shaft mounted on said frame with its axis of rotation at right angles to the axis of rotation of the unbalanced mass, synchronized driving means for rotating the unbalanced mass and the rotatable shaft, a mass pivotally mounted on said shaft to rotate therewith, means adjustable longitudinally of the axis of the unbalanced mass supporting said rotatable shaft on said frame to permit selection of the plane of operation of the shaft, and means to determine the eccentricity of said first-named mass and its angular position by measurement of the vibrations of said second-named mass.

8. In apparatus to determine the amount and direction of unbalance in rotating machine parts, means to floatingly support a machine part, a shaft rotatably and bodily adjustably mounted on said means adjacent said part to rotate at the same speed as the machine part, and about an axis at right angles to the axis of rotation of said part, means for synchronously driving the part and the shaft, said shaft mounting being adjustable in a direction parallel to the axis of rotation of the machine part, a mass attached to said shaft and pivotal about an axis which is perpendicular to the axis of rotation of said shaft, and means to measure the amount of deviation of said mass from a predetermined norm.

9. In a balancing machine, a floating frame to hold a rotating machine part, a mass, an elastic connection between said frame and mass so that the mass and connection are capable of vibration in a direction perpendicular to the axis of rotation of the machine part, said mass and elastic connection having a resonant frequency equal to the speed of rotation of the machine part, and whose vibration nullifies movement of the frame, adjustable supporting means for the elastic connection on said frame to permit selection of the plane of operation of the elastically connected mass, a variable condenser consisting of a moving plate attached to said vibrating mass and a stationary plate attached to a part of the frame, an oscillator detector unit connected to the plates of the variable condenser, an oscillograph connected to the oscillator detector unit, and means to synchronize the oscillograph sweep circuit with the speed of rotation of the machine part.

10. A frame yieldably mounted for movement in at least one direction having an unbalanced body mounted to rotate thereon, a mass, a vibratable mounting means for said mass, guide means on said frame extending longitudinally thereof, and connecting means cooperating with said mounting and said guide means for attaching said mounting means to said guide means at a selected point along the frame, said mass and mounting being of such value as to be tuned to a resonant frequency equal to that of the speed of rotation of the body and absorbing the oscillatory movement of the frame as set up by the unbalanced forces so that the mass only will vibrate and the amplitude of vibration will be a direct measurement of the unbalanced forces.

11. A frame yieldably mounted for movement in at least one direction, having an unbalanced body mounted to rotate thereon, a plurality of masses, separate vibratable mounting means for said masses, guide means on said frame extending longitudinally thereof, and connecting means cooperating with the mounting and guide means for attaching said mounting means to said guide means at spaced selected points along the frame, said masses and their mounting means being tuned to a resonant frequency equal to that of the speed of rotation of the body so that the masses may be located in alignment with planes in the body in which it is desired to apply corrective measures and nullify oscillation of the body and the amplitude of oscillation of each mass will be a direct indication of the amount of unbalance at that plane for total correction.

12. A frame yieldably mounted for movement in at least one direction, having an unbalanced body mounted to rotate thereon, a plurality of masses, separate vibratable mounting means for said masses, guide means on said frame extending longitudinally thereof, and connecting means cooperating with the mounting and guide means for attaching said mounting means to said guide means at spaced selected points along the frame, said masses and their mounting means being tuned to a resonant frequency equal to that of the speed of rotation of the body so that the masses may be located in alignment with planes in the body in which it is desired to apply corrective measures and nullify oscillation of the body and the amplitude of oscillation of each mass will be a direct indication of the amount of unbalance at that plane for total correction, means whose electrical characteristics are varied by changes in said amplitude mounted upon the frame and mounting means, signal generating means mounted at a point on the unbalanced mass and on the frame to provide an impulse per revolution, an oscilloscope connected to said signal generating means and to said means whose electrical characteristics vary with a change in amplitude so that the sweep circuit is actuated by a signal generator and the deflection of the same by the change in electrical characteristics to determine the angular position and amount of the unbalanced forces in the planes selected.

LAWRENCE F. HOPE.

REFERENCES CITED

The following references are of record in the file of this patent:

UNITED STATES PATENTS

| Number | Name | Date |
| --- | --- | --- |
| 989,958 | Frahm | Apr. 18, 1911 |
| 1,296,610 | Akimoff | Mar. 11, 1919 |
| 1,951,828 | Heymann et al. | Mar. 20, 1934 |
| 2,037,443 | Van Degrift | Apr. 14, 1936 |
| 2,167,488 | Ohlson | July 25, 1939 |
| 1,467,373 | Gowin | Sept. 11, 1923 |
| 2,253,795 | List | Aug. 26, 1941 |
| 2,344,753 | Van Degrift | Mar. 21, 1944 |
| 1,638,782 | Paton | Aug. 9, 1927 |
| 2,137,591 | Sarazin | Nov. 22, 1938 |
| 2,191,862 | Sarazin | Feb. 27, 1940 |

FOREIGN PATENTS

| Number | Country | Date |
| --- | --- | --- |
| 256,277 | Great Britain | Nov. 25, 1926 |
| 280,380 | Great Britain | Nov. 17, 1927 |
| 346,819 | Great Britain | Apr. 15, 1931 |
| 399,845 | Great Britain | Oct. 13, 1933 |
| 65,535 | Austria | July 10, 1914 |
| 308,247 | Great Britain | Nov. 5, 1929 |
| 346,819 | Great Britain | Apr. 15, 1931 |